(12) United States Patent
Lane et al.

(10) Patent No.: US 6,749,374 B1
(45) Date of Patent: *Jun. 15, 2004

(54) FLOW DEVELOPMENT CHAMBER FOR CREATING A VORTEX FLOW AND A LAMINAR FLOW

(75) Inventors: Darin L. Lane, Littleton, CO (US); Walter D. Prince, Littleton, CO (US)

(73) Assignee: Ecotechnology, Ltd., Sheridan, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/618,695

(22) Filed: Jul. 18, 2000

Related U.S. Application Data

(63) Continuation of application No. 08/989,186, filed on Dec. 11, 1997, now Pat. No. 6,155,751.

(51) Int. Cl.[7] .............................................. B65G 53/52
(52) U.S. Cl. ...................... 406/92; 406/144; 406/191; 406/195
(58) Field of Search .......................... 406/92, 122, 144, 406/145, 191, 195

(56) References Cited

U.S. PATENT DOCUMENTS

| | | | |
|---|---|---|---|
| 954,944 A | 4/1910 | Dunn | |
| 1,254,393 A | 1/1918 | Clendon | |
| 1,578,954 A | 3/1926 | Caracristi | |
| 1,614,713 A | 1/1927 | Caracristi | |
| 1,755,779 A | 4/1930 | Goebels | |
| 1,769,197 A | 7/1930 | Wetmore | |
| 2,252,581 A | 8/1941 | Saint-Jacques | |
| 2,614,892 A | 10/1952 | Cherewick | |
| 2,912,942 A | * 11/1959 | Whitney et al. | ............ 110/104 |
| 3,149,884 A | * 9/1964 | Jones | .................... 302/53 |
| 3,301,605 A | 1/1967 | Greenway | |
| 3,311,234 A | 3/1967 | Rumpf et al. | |
| 3,370,890 A | 2/1968 | Morgan | |
| 3,377,107 A | 4/1968 | Hodgson et al. | |
| 3,602,552 A | 8/1971 | Morgan | |
| 3,664,360 A | 5/1972 | Royle et al. | |
| 3,693,842 A | 9/1972 | Cozzarin et al. | |
| 3,708,239 A | 1/1973 | Stahle | |
| 3,970,547 A | 7/1976 | Theodore et al. | |
| 3,973,802 A | * 8/1976 | Kwon et al. | ................... 302/24 |
| 3,975,058 A | 8/1976 | York | |
| 4,054,507 A | 10/1977 | Pouska | |
| 4,057,399 A | 11/1977 | Cole et al. | |
| 4,391,561 A | 7/1983 | Smith et al. | |

(List continued on next page.)

FOREIGN PATENT DOCUMENTS

DE 140881 9/1930

OTHER PUBLICATIONS

U.S. patent application Ser. No. 10/011,493 (with pending claims) Darin L. Lane et al., Filed Dec. 4, 2001.

*Primary Examiner*—Joseph A. Dillon
(74) *Attorney, Agent, or Firm*—Christie, Parker & Hale, LLP

(57) ABSTRACT

A pneumatic conveying system for conveying particulate material through a conduit that creates a strong laminar flow of materials and air surrounded by a boundary layer flow of air, such that long transport distances through dramatic elevation and directional changes can be achieved. Embodiments of the system include a blower assembly, an inlet conduit, an outlet conduit and a mixing chamber, wherein the mixing chamber includes an outer barrel, an inner barrel and an accelerating chamber. Low pressure air is supplied to the system by the blower assembly and mixed with particulate material. The air/material mixture is transported through the mixing chamber into the accelerating chamber and through the outlet conduit. In other preferred embodiments, the particulate material is mixed with the air in the accelerating chamber.

30 Claims, 9 Drawing Sheets

U.S. PATENT DOCUMENTS

| | | |
|---|---|---|
| 4,449,862 A | 5/1984 | Beck |
| 4,451,184 A * | 5/1984 | Mitchell ..................... 406/105 |
| 4,500,228 A | 2/1985 | McDonald et al. |
| 4,684,296 A | 8/1987 | Horii et al. |
| 4,711,607 A * | 12/1987 | Wynosky et al. ............. 406/30 |
| 4,851,110 A | 7/1989 | Rolle et al. |
| 5,018,910 A * | 5/1991 | Weiss ......................... 406/144 |
| 5,069,582 A | 12/1991 | Young |
| 5,426,137 A | 6/1995 | Allen |
| 5,681,132 A * | 10/1997 | Sheppard ..................... 406/61 |
| 5,718,539 A | 2/1998 | Segota |
| 5,827,909 A | 10/1998 | DesMarais |
| 5,863,155 A | 1/1999 | Segota |
| 6,089,795 A | 7/2000 | Booth |
| 6,155,751 A | 12/2000 | Lane et al. |
| 6,217,261 B1 * | 4/2001 | Santa Cruz ................. 406/145 |

\* cited by examiner

FLOW DEVELOPMENT CHAMBER FOR CREATING A VORTEX FLOW AND A LAMINAR FLOW

This is a Continuation of Ser. No. 08/989,186, filed Dec. 11, 1997, now U.S. Pat. No. 6,155,751 issued Dec. 5, 2000.

FIELD OF THE INVENTION

This invention is directed to apparatus and methods for conveying varying size particulate material through a conduit, such as, a pipe or hose, over long distances; more particularly, to apparatus and methods that convey material in a pneumatic material handling device.

BACKGROUND OF THE DISCLOSURE

Pneumatic conveying systems for transporting material through a conduit have been in use for years and are well known in the art. Over the years the designs of these systems have changed to provide for greater efficiency in operational cost and labor. For instance, early systems utilized belt driven conveyors to transport materials from an input hopper to a mixing chamber. Unfortunately, these systems were inefficient in that the belt drives experienced many problems, such as wearing and breakage. Due, in part, to problems experienced with belt systems, pneumatic conveying systems were developed.

Generally, pneumatic conveying systems include a feed mechanism, such as, an auger, for transporting the material to a mixing chamber. In the mixing chamber, the material is entrained in pressurized air which is supplied into the mixing chamber through jets or air inlets. In some systems, the material and air are mixed and accelerated in an accelerating device, such as, a venturi pipe, which is connected to the mixing chamber. The accelerated mixture is then transported out of the venturi pipe and into a conduit which conveys the materials to a specified destination. Typically, conventional pneumatic conveying systems can transport material up to about 1,000 feet. The limited distance the material can be conveyed is due, in part, to the operating pressure of the system and the instability of the material flow in the conduit.

Many other problems also exist with pneumatic conveying systems. For example, if excessive pressure builds up in the conduit, e.g., from a blockage in the conduit, gas and product back flow into the hopper. This back flow is known as "blowback". Further, as the material travels through the conveying conduit, in earlier designs, and current designs, it strikes the walls of the conduit. This not only damages the walls of the conduit, but damages the material as well. Thus, problems of erosion of equipment and attrition of product are also present. Finally, many current designs incur a high cost of operation due to the high requirement of energy input to operate the system.

Many pneumatic systems have been developed to address different problems. For instance, the blowback problem, among others, was addressed in the system described in U.S. Pat. No. 4,711,607 to Wynosky et al. In the Wynosky device, a rotating auger enclosed by a cylindrical barrel transports particulate material towards the discharge end of the barrel which resides within a plenum chamber. Pressurized gas is introduced into the plenum chamber for creating a gas flow in a venturi pipe, which is coupled at one end to the plenum chamber and at its other end to a conduit used to transport the material. Measurements of the pressure differential between the plenum chamber and the conduit are used to monitor potential blowback problems. Further, this system operates at lower operating pressures than most systems, e.g., 12–15 psi. Nonetheless, this system does not achieve a sufficiently stable flow of material through the conduit, which restricts the distance over which the material can be transported, including the ability to transport the material through elevational or directional changes.

U.S. Pat. No. 5,681,132 to Sheppard, Jr. describes an on-line pumping unit designed to extend transport distances. In Sheppard, the pumping unit includes a screw conveyor assembly coupled to a laminar flow, inductor assembly. In this system, the inductor assembly forms the core of a linear accelerator apparatus used to extend transport distances. Nonetheless, this system does not teach how material can be conveyed over very long distances, such as, for example, a mile.

As shown from above, a need exists in the art for a system that requires low energy input, reduces equipment wear, reduces product degradation and can transport materials for long distances, such as, a mile. Further, a need exists for a system that can convey materials through dramatic high angle and vertical elevation and sharp directional changes. A need also exists for a system that can convey materials without plugging, and can further classify and mechanically dry materials during processing.

SUMMARY OF THE DISCLOSURE

The instant invention is directed to a pneumatic material handling system that allows the formation of a strong laminar flow of materials and air surrounded by a boundary layer flow of air, such that long transport distances through dramatic elevation and directional changes can be achieved. The boundary layer flow of air protects the walls of the conducting conduit from assault by the conveyed materials, thereby protecting both the walls of the conduit and the conveyed material. Further, this system utilizes low pressure air to initiate the conduction of material, thereby dramatically reducing the operational costs of this system.

Preferred embodiments of the instant invention include a blower assembly, an inlet and an outlet conduit. The blower assembly supplies low pressure air to the system through the inlet, which in some preferred embodiments receives both air and the particulate material to be conveyed. The inlet is coupled to the flow developing device such that the air from the blower assembly passes into the mixing chamber.

The mixing chamber includes an outer barrel, an inner barrel and an accelerating chamber, wherein the inner barrel is disposed within the outer barrel and wherein the outer barrel is coupled to the accelerating chamber. The inner barrel of the mixing chamber can be either solid or hollow depending upon how materials are to be transported into the system. If materials are to be transported into the system entrained in air, then a solid or capped inner barrel is generally used. If materials are to be transported by an auger or screw type conveyor, then a hollow inner barrel may be utilized and the auger or screw placed within the hollow inner barrel.

Typically, the air from the blower is passed tangentially over the inlet such that the air, or air and material mixture, sets up a flow pattern that circulates and traverses the inner barrel towards the accelerating chamber. Once in the accelerating chamber, a vortex flow is formed. As the flow moves through the accelerating chamber, the flow accelerates and a boundary layer flow begins to form. The flow mixture then travels out of the accelerating chamber into the outlet conduit which is coupled to the accelerating chamber. As the air/material mixture travels down the outlet conduit, the vortex flow transforms into a laminar flow surrounded by the boundary layer flow. The mixture is then transported the length of the outlet conduit until it reaches its destination.

In operation, embodiments of this invention operate at pressures between 1–4 psi. One advantage of this lower pressure is that the operational costs are substantially reduced. A further advantage includes the reduction or substantial elimination of blowback problems.

Preferred embodiments of the instant invention are capable of transporting material flows through dramatic elevation and directional changes. One advantage of this feature is that the system can be utilized in various types of space and over varying terrain.

Embodiments of this system can be scaled to varying sizes. Advantages of varying sizes of this system include the ability to build a system in virtually any size space and allows users to more appropriately meet their needs, e.g., lower costs and lower production requirements and lower maintenance costs.

The material input into embodiments of this system are transported down the conduit pipe in a laminar flow surrounded by a boundary layer flow. An advantage of the boundary layer flow is that it protects the conduit pipe from material as it passes down the pipe and further protects the material that is being transported.

Due to high air to particle ratio in the material flow, the system can be shut down and restarted without the need to clear the lines, thereby gaining an advantage of eliminating costly maintenance and line plugging associated with traditional technologies.

Additionally, embodiments of this system do not emit combustion or chemical pollutants. At least one advantage of this feature is that the system does not adversely affect the environment.

Further, materials transported down the conduit are mechanically, not thermally dried of surface moisture. This provides the advantage of eliminating explosion hazards associated with current thermal dryers. It also surface dries materials at considerable lower energy costs than thermal dryers.

The above and other advantages of embodiments of this invention will be apparent from the following more detailed description when taken in conjunction with the accompanying drawings. It is intended that the above advantages can be achieved separately by different aspects of the invention and that additional advantages of this invention will involve various combinations of the above independent advantages such that synergistic benefits may be obtained from combined techniques.

BRIEF DESCRIPTION OF THE DRAWINGS

The detailed description of preferred embodiments of the invention will be made with reference to the accompanying drawings, wherein like numerals designate corresponding parts in the figures.

DETAILED DESCRIPTION OF THE PREFERRED EMBODIMENTS

Figure 1:
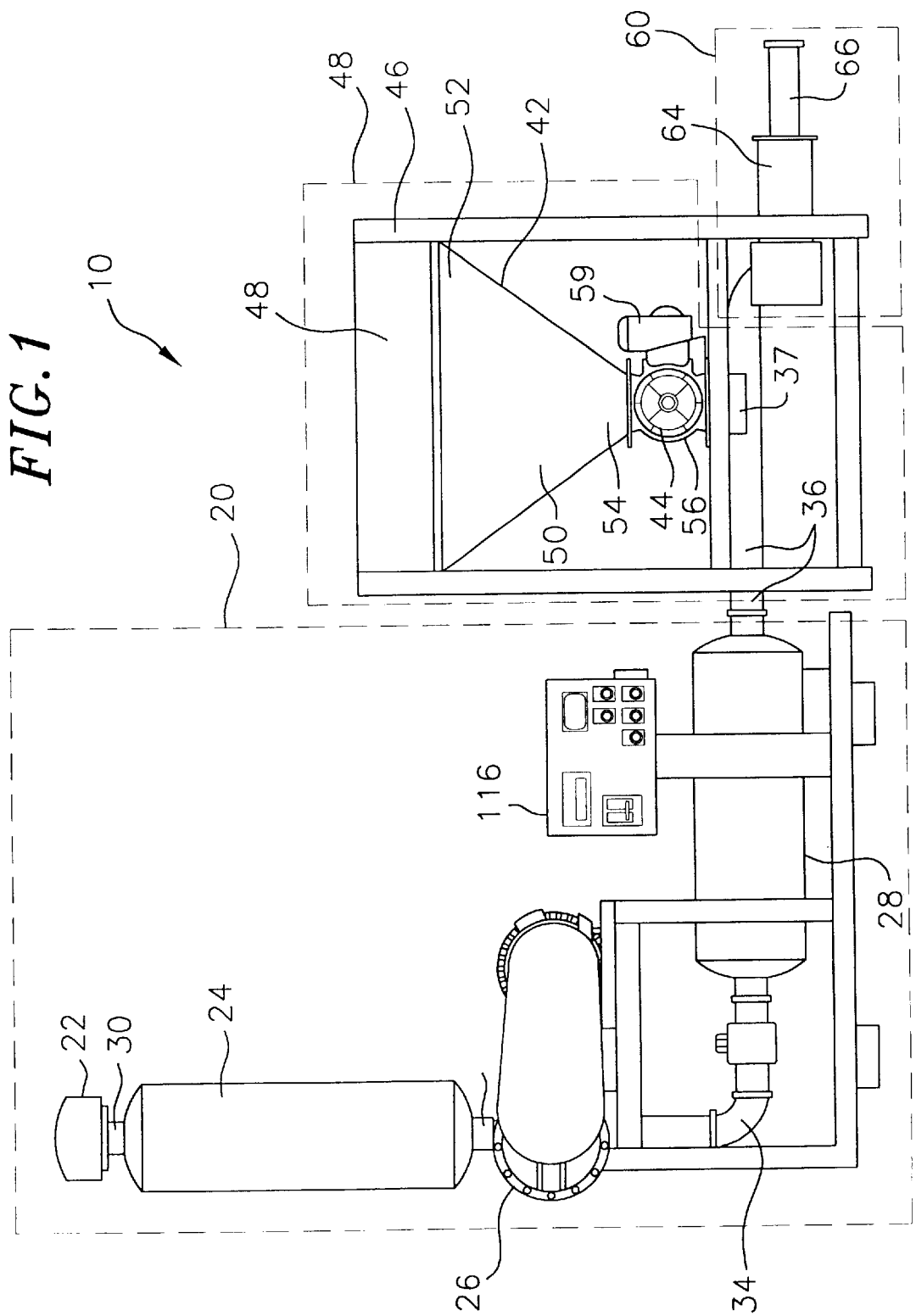
FIG. 1 is a schematic of a preferred embodiment of a material conveying system embodying features of the present invention.

Preferred embodiments of the instant invention are directed to an apparatus and a method for pneumatically conveying particulate material through a conduit over long distances, such as, for example, a mile, and through elevation and directional changes. In some embodiments the system further mechanically dewaters/or and classifies the material by mass. With reference to FIG. 1, a preferred embodiment of an overall pneumatic material handling system 10 includes an air delivery system 20, a material delivery system 40 and a mixing system 60. The air delivery system 20 includes an air filter 22, an inlet silencer 24, a blower assembly 26, an outlet silencer 28 and a plurality of coupling pipes 30, 32, 34 and 36. The blower assembly 26 draws in air through the inlet filter 22 from the environment and filters out contaminants and other particulates. Inlet filters 22 are well known in the art and manufactured, for example, by Nelson Industries under the Universal Silencer name. Depending upon the environmental conditions, some preferred embodiments do not require inlet filters as the air does not require filtering.

The inlet filter 22 is connected by coupling pipe 30 to the inlet silencer 24 which includes a cylindrical body having a first end and a second end. The first end and the second end each include openings for passing air into and out of the silencer 26. Silencers are also well known in the art and are manufactured, for example, by Nelson Industries under the Universal Silencer name.

The inlet silencer 24 is connected by coupling pipe 32 to the blower assembly 26, which is any air blowing device that is capable of delivering low pressure air to the system. The blower assembly 26 includes an inlet and outlet, wherein incoming air enters the blower assembly 26 through the inlet and passes out of the blower assembly 26 through the outlet. In preferred embodiments, a positive displacement blower generating air having a pressure capability of up to 12 psi may be used. In one preferred embodiment, a Sutorbilt positive displacement blower, manufactured by Gardner Denver may be used.

The blower assembly 26 is connected by coupling pipe 34 to the outlet silencer 28. Similar to the inlet silencer 24, the outlet silencer 28 includes a cylindrical body having a first end and a second end, wherein the first end and the second end each include openings for passing air into and out of the outlet silencer 28. Both the inlet and outlet silencers 24, 28 are used to reduce excessive noise generated by the blower assembly 26. If noise is not a consideration, then inlet or outlet silencers are not necessary.

The coupling pipe 36 is connected to the second end of the outlet silencer 28 and extends towards the mixing system 60. In preferred embodiments, the coupling pipe 36 has an opening 37 for receiving material from the material delivery system 40 as described below.

The material delivery system 40 preferably includes a hopper 42, a rotary feeder 44 and a frame 46. The hopper 42 includes an open end 48 and a chute 50. The open end 48 of the hopper 42 accepts incoming material to be processed, such as, for example, coal or rubber. Typically, the open end 48 is large enough to accept large quantities of materials of varying sizes. In one preferred embodiment, the open end 48 is rectangular in shape, although any shape capable of accepting incoming material is suitable.

The chute 50 of the hopper 42 is funnel shaped having a first end 52 and a second end 54. The first end 52 of the chute 50 resides adjacent the open end 48 of the hopper 48 such that material falls into the portion of the chute 50 having the largest diameter. The open end 48 and the chute 50 can be manufactured as a single piece or can be separately manufactured and coupled together, such as, for example, by welding. In preferred embodiments, the hopper 42 is made from materials, such as, but not limited to, steel aluminum or metal alloys, although any material capable of accepting large quantities of materials is suitable.

Figure 7:
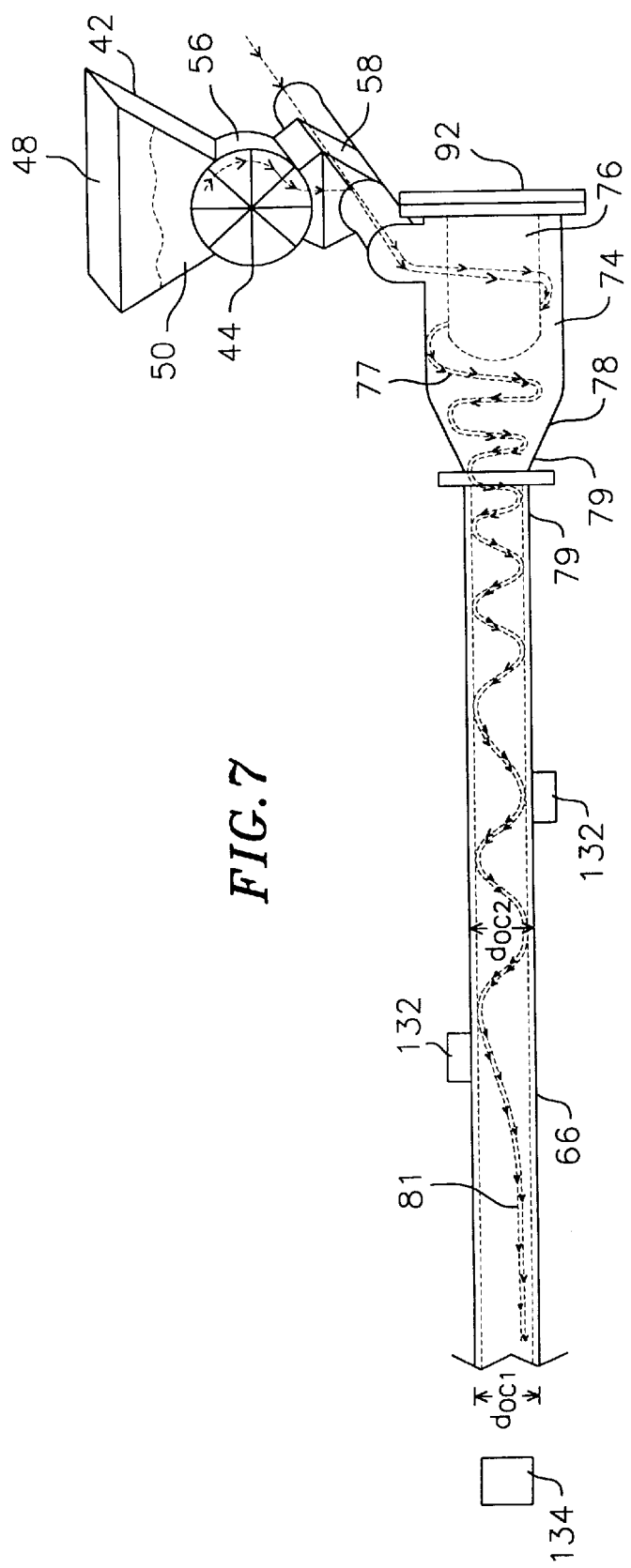
FIG. 7 is a schematic of another preferred embodiment of a material conveying system utilizing a solid inner barrel and illustrating the flow paths of the air and material.

The rotary feeder 44 includes a chamber 56 having a rotor, a dispensing chute 58 and a motor 59. The chamber 56 is a hollow barrel, wherein the interior of the barrel is separated into segments by radial spokes. The chamber 56 further includes a top opening and a bottom opening. The top opening of the chamber 56 is coupled to and communicates with the second end 54 of the hopper 42. With reference also to FIG. 7, the dispensing chute 58 has an outlet disposed over the opening 37 of the coupling pipe 36 such that material flowing through the dispensing chute 58 enters the coupling pipe 36.

The motor 59 resides adjacent the rotary feeder 44 and causes the rotor to rotate. The motor 59 is any suitable device for driving the rotary feeder 44 and may be electrically driven or generator operated. Rotary feeders are well known in the art and are manufactured, for example, by Bush & Wilton Valves, Inc. Some preferred embodiments do not require a rotary feeder 44.

The frame 46 provides support to the hopper 42 and rotary feeder 44. The frame includes a plurality of legs, wherein the open end 48 of the hopper 42 is coupled to the legs, such as, for example, by welding. Some preferred embodiments do not require a frame 46.

With reference to FIGS. 2, 3a, 3b and 4, the mixing system 60 includes an inlet conduit 62, a mixing chamber 64 and an outlet conduit 66. Preferably, the inlet conduit 62 is a pipe, although any conduit, such as, for example, a hose, which is capable of receiving air and/or material is suitable. The inlet conduit 62 should preferably be capable of receiving large amounts of particulate material at high rates. For instance, in one preferred embodiment, the inlet conduit 62 is capable of receiving material up to 3" in diameter at a rate of 500 tons/hour. For greater volumes, multiple systems can be used.

Figure 3A:
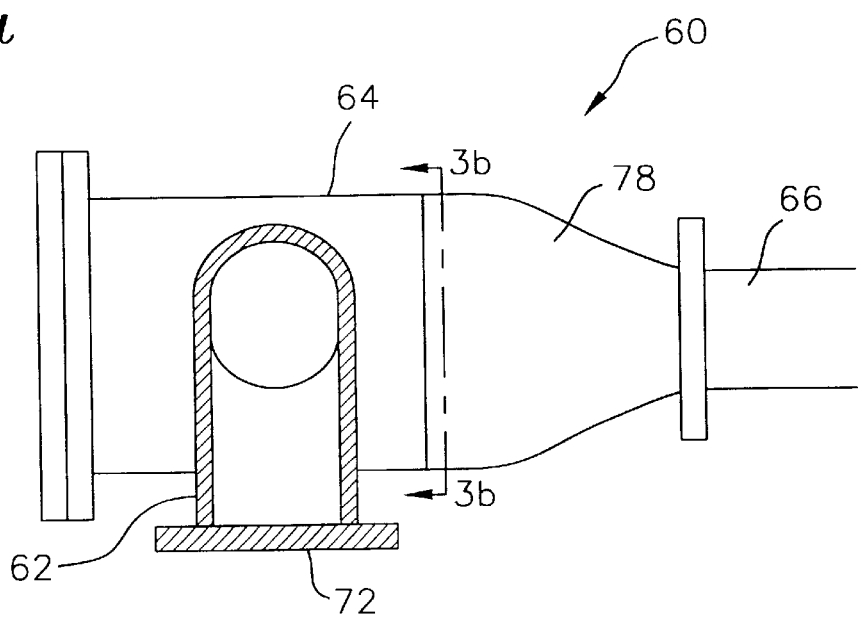
FIG. 3a is a plan view of a preferred embodiment of a cross section of the inlet coupled to the outer barrel of the material conveying system of FIG. 1.
Figure 3B:
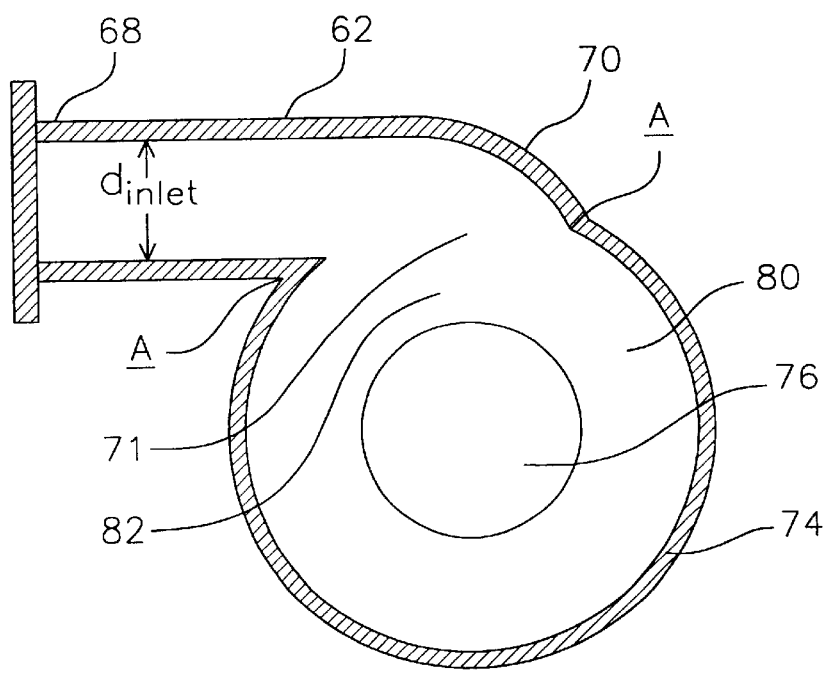
FIG. 3b is a side cross section of the inlet in FIG. 3a coupled to the outer barrel.

As shown in FIG. 3b, the inlet conduit 62 includes a first end 68, a second end 70 and a coupling flange 72, wherein both the first end 68 and the second end 70 are open. Preferably, the diameter $d_{inlet}$ of the inlet conduit 62 is substantially constant throughout the distance between the first end 68 and a point A at which the inlet conduit 62 couples to the mixing chamber 64. Preferred embodiments typically have diameter sizes of 2", 4", 6", 8", 10", 12" and 18" as it has been found that most materials with diameter sizes up to 5" can pass through inlets having these size diameters.

The coupling flange 72 extends radially outward from the first end 68 of the inlet conduit 62 and has a plurality of opening 73 for receiving fasteners. The coupling flange 72 is coupled to the second end of the coupling pipe 36 such that the inlet conduit 62 is in fluid communication with the coupling pipe 36 and can receive incoming air and particulates.

Typically, the inlet conduit 62 is cylindrical in shape, although any shape, such as, for example, a rectangle or octagon, which is capable of passing air and material is suitable. In preferred embodiments, the inlet conduit 62 is made from durable materials, such as, for example, aluminum, metal alloys or steel, although any material capable of contacting a wide variety of materials without sustaining substantial damage is suitable.

Figure 4:
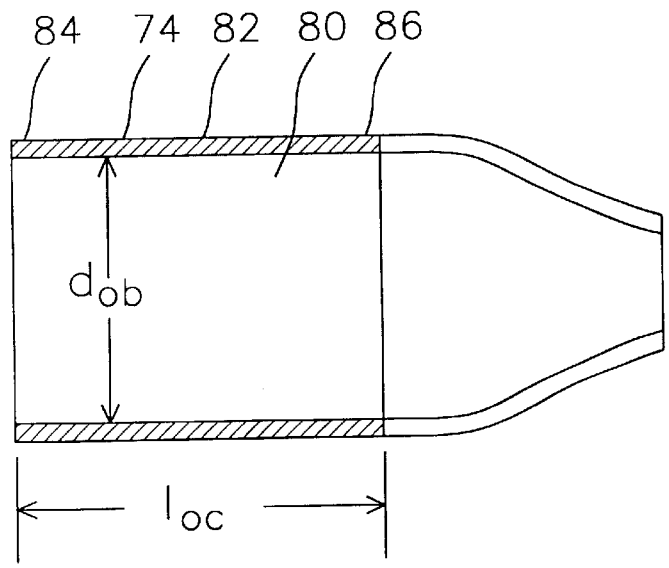
FIG. 4 is a preferred embodiment of the outer barrel of the material conveying system of FIG. 1.

The mixing chamber 64 further includes an outer barrel 74, an inner barrel 76 and an accelerating chamber 78. With reference also to FIG. 4, the outer barrel 74 includes a hollow interior 80 having an inner diameter $d_{ob}$, an opening 71 (see FIG. 3b), a first end 84 and a second end 86.

The hollow interior 80 is capable of receiving air and material. The second end 71 of the inlet conduit 62 (FIG. 3b) is coupled around the opening 70 such that the hollow interior 80 of the mixing chamber 64 (FIG. 4) is in fluid communication with the inlet conduit 62 of FIG. 3b.

Typically, the outer barrel 74 is cylindrical in shape. In preferred embodiments, the outer barrel 74 is made from durable materials, such as, for example, aluminum, metal alloys or steel, although any material capable of contacting a wide variety of materials without incurring substantial damage is suitable.

Figure 2:
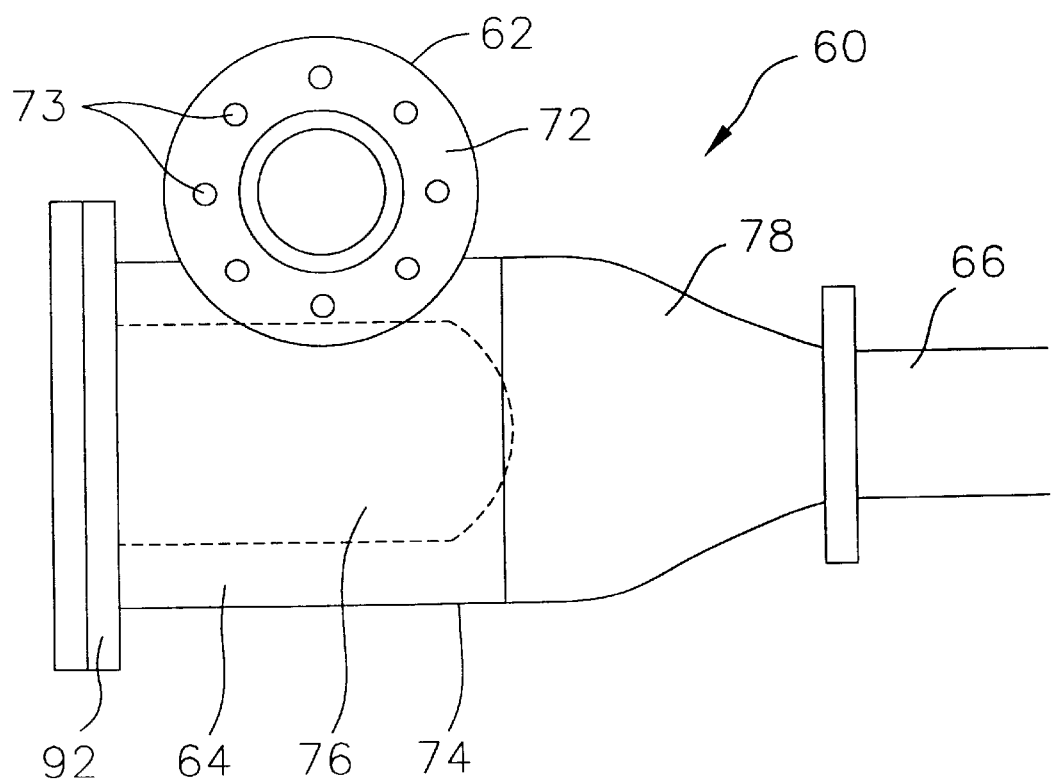
FIG. 2 is a top view of a preferred embodiment of the mixing chamber and an inlet of the material conveying system of FIG. 1.
Figure 5:
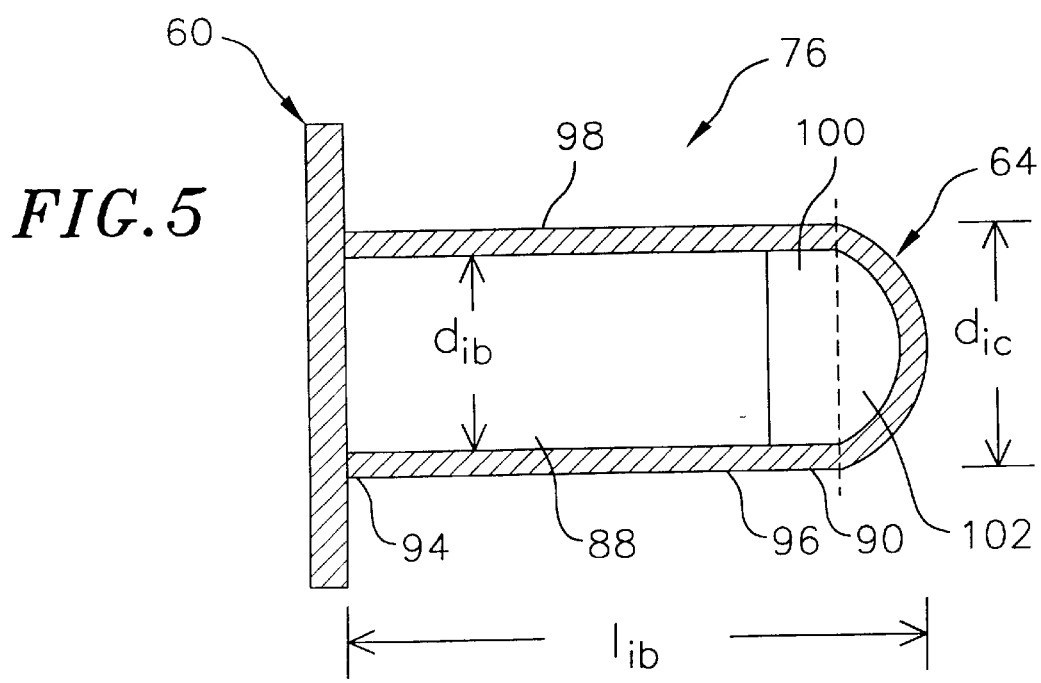
FIG. 5 is a cross section of a preferred embodiment of a solid inner barrel of the material conveying system of FIG. 1.

With reference also to FIG. 5, the inner barrel 76 includes a first member 88, a second member 90 and a mounting flange 92. The first member 88 includes a first end 94, a second end 96 and an outer surface 98. The inner barrel 76 is disposed within the hollow interior 80 of the outer barrel 74 (FIG. 2). In one preferred embodiment, the inner barrel 76 is solid. In other preferred embodiments, described below, the inner barrel 76 is hollow.

Preferably, the first member 88 (FIG. 5) is cylindrical in shape. Further, the diameter $d_{ib}$ of the first member 88 is preferably constant between the first end 94 and the second end 96.

The mounting flange 92 is a plate of any shape, such as, for example, a disk or rectangular element which is coupled to the first end 94 of the first member 88. In some preferred embodiments, the mounting flange 92 and the first member 88 are formed as a single piece. The mounting flange 92 also connects to the first end 84 of the outer barrel 74.

The second member 90 of the inner barrel 76 includes a cylindrical section 100 and a hemispherical end portion 102. The cylindrical section 100 is coupled to the second end 96 of the first member 88.

The hemispherical end portion 102 resides adjacent the cylindrical section 100. In some preferred embodiments, the hemispherical end portion 102 and the cylindrical section 100 are formed as a single element. Although this preferred embodiment depicts a hemispherically shaped end portion, any geometry from a flat plate to a hemispherically shaped cap is suitable. Typically, the radius of the hemispherical end portion 102 is substantially equivalent to the radius of the first member 88 and the cylindrical section 100 (FIG. 5 not drawn to scale).

Preferred embodiments of the inner barrel 76 are made from materials, such as, but not limited to, steel, metal alloys and aluminum. However, any material capable of contacting a wide variety of materials without incurring substantial damage is suitable.

Figure 6:
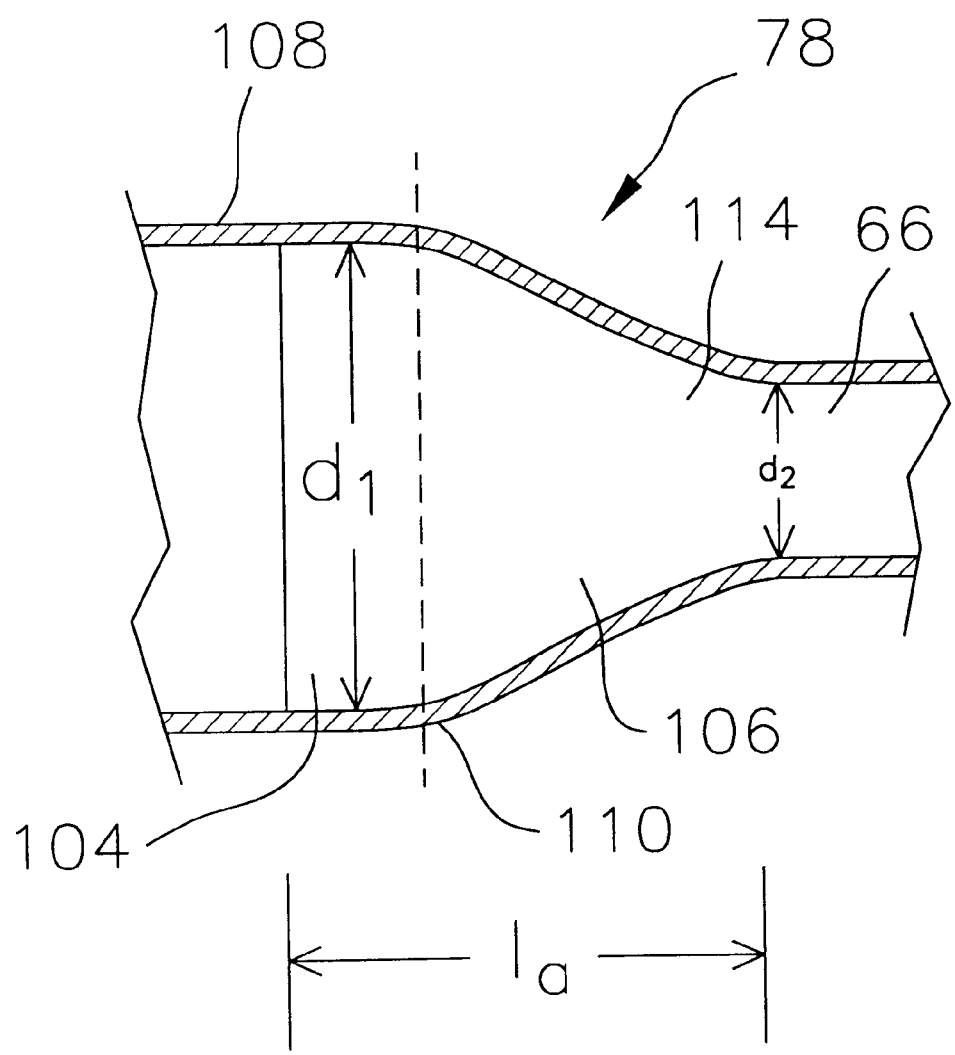
FIG. 6 is a cross section of a preferred embodiment of an accelerating chamber of the material conveying system of FIG. 1.

With reference also to FIG. 6, the accelerating chamber 78 includes an outer cylindrical section 104 and a conical section 106. The outer cylindrical section 104 includes a first end 108 and a second end 110, wherein the diameter $d_1$ is preferably constant between the first end 108 and the second end 110. The first end 108 of the outer cylindrical section 104 of the accelerating chamber 78 is coupled to the second end 86 of the outer barrel 74.

The conical section 106 includes a first end 112 and a second end 114, wherein the first end 112 is coupled to the second end 110 of the cylindrical section 104. The diameter between the first end 112 and the second end 114 of the conical section decreases in size from the first end 112 to the second end 114. In one preferred embodiment, the conical section 106 is a standard concentric pipe reducer. In another preferred embodiment, the accelerating chamber 78 does not include the cylindrical section 104, rather, the accelerating chamber is a cone, such as, for example, a flat rolled cone, preferably having an angle of about 30°–55°.

With reference to FIGS. 6 and 7, the outlet conduit 66 is a process pipe having an outside diameter $d_{oc1}$ and an inside diameter $d_{oc2}$ for conveying material to a predetermined destination. The outlet conduit 66 is coupled to the second end 112 of the conical section 106 of the accelerating chamber 78 such that the material and air mixture is passed from the accelerating chamber 78 into the outlet conduit 66. The outlet conduit 66 can extend for long distances, such as for example, greater than 1 mile.

Referencing FIGS. 1 and 7, in operation, the blower assembly 26 is turned on and air is drawn into the inlet filter 22. The air is cleaned of particulates and passes into the inlet silencer 24. The air passes through the inlet silencer 24 and enters the blower assembly 26. The blower assembly 26 passes air having up to 12 psi into the outlet silencer 28. As stated above, the inlet and outlet silencers reduce the amount of noise generated by the blower assembly 26. After the air passes through the outlet silencer 28, it exits into coupling pipe 36 and travels past the material delivery system 40.

Either before, after or during the time that the air delivery system 20 has begun operation, material is input into the open end 48 of the hopper 42 or other feeder device. The material passes through the open end 48 and into the chute 50 wherein the material may accumulate until fed out by the rotary feeder 44.

The rotary feeder 44 turns at a predetermined rate such that only specified quantities of material are released from the feeder 44. The material drops through the dispensing chute 58 and through the opening in the coupling pipe 36.

Figure 8A:
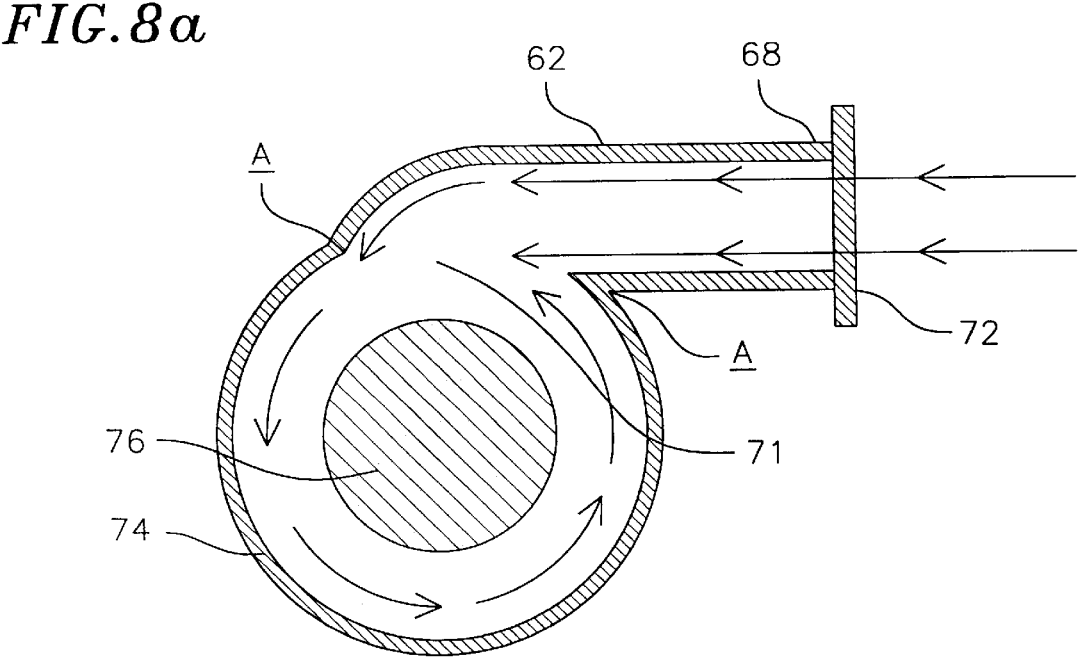
FIG. 8a is a preferred embodiment of a counterclockwise rotating air flow path through the outer barrel of FIG. 4.
Figure 8B:
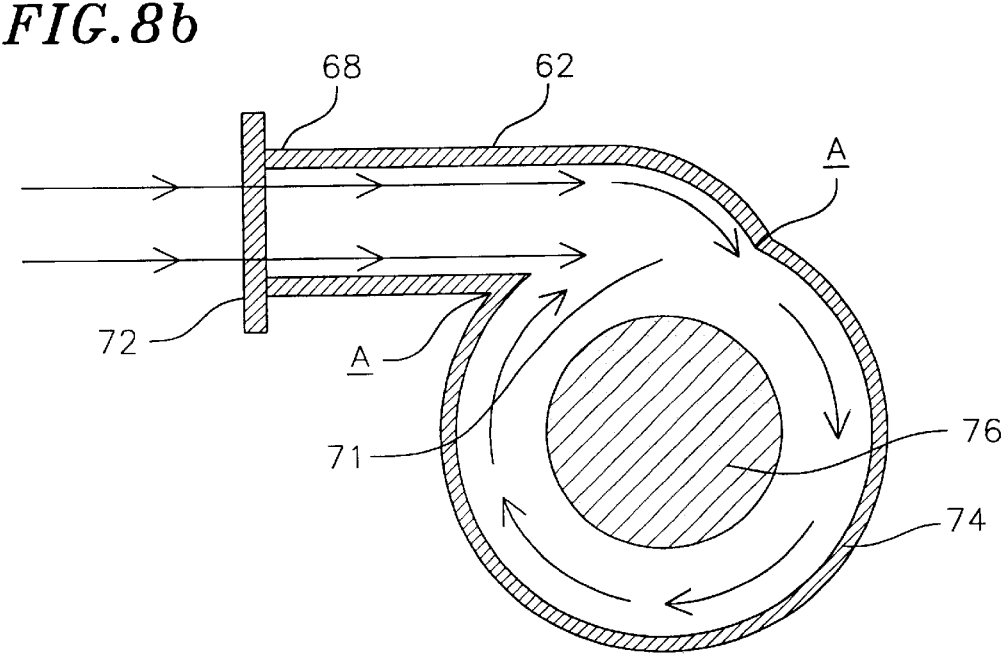
FIG. 8b is a preferred embodiment of a clockwise rotating air flow path through the outer barrel of FIG. 4.

As air passes through the coupling pipe 36, it picks up the material and entrains the material in the air flow. The material and air continue through the coupling pipe 36 and enter the first end 68 of the inlet conduit 62. With reference also to FIG. 8a, after entering the inlet conduit 62, the material/air mixture preferably flows around the inner surface of the outer barrel 74. This is in contrast to the turbulent flows created in current pneumatic systems. It is believed that the tangential input of the air/material mixture along the interior of the outer barrel 74 leads to the development of the steady counterclockwise flow (when viewed from the back of the chamber) of the mixture in the outer barrel 74. With reference to FIG. 8b, in other preferred embodiments, the inlet conduit 62 may be mounted to the opposite side of the outer barrel 74 such that the air/material mixture flows in a clockwise direction in systems in use below the equator due to the Coriolis effect. The counterclockwise flow is preferred north of the equator due to the fact that a natural vortex rotates counterclockwise. However, clockwise rotations can also be established north of the equator.

As more air and material flows into the mixing chamber 64, the air/material mixture traverses the length of the inner barrel 76 while flowing counterclockwise around its outer surface 98 until it reaches the hemispherical end portion 102 in FIG. 5.

After passing over the hemispherical end portion 66 the air/material flow preferably forms a vortex 77, which is a combination of a sink flow and an irrotational vortex flow, and is accelerated through the accelerating chamber 78 (FIG. 7). As the flow traverses the length of the accelerating chamber 78, Taylor vortices, in the form of a boundary layer flow 79 of air, begins to form along the inner surface of the accelerating chamber 78 such that the forming boundary layer flow 79 surrounds the vortex flow 77. Typically, the, boundary layer flow is 0.125"–0.25" thick. Generally, no material is found in the boundary layer flow 79, however, moisture is typically found in the boundary layer.

The vortex flow 77 and forming boundary layer flow 79 exit the accelerating chamber 78 through the second end 114 of the conical section 106 and enter the outlet conduit 66. As the flows 77, 79 exit the accelerating chamber 78, the boundary layer flow 79 is about substantially formed and traverses down the outlet conduit 66 at velocities of about less than 5 mph. The air flowing in the boundary layer 79 preferably circulates around the inner circumference of the outlet conduit 66.

The vortex 77 continues to travel for about 10–60 feet within the outlet conduit 66 prior to a laminar flow 81 forming. The length of the vortex can vary with the volume of air or product mass. In contrast to the slow moving boundary layer flow 79, the air in the laminar flow 81 is moving at velocities of about 50–60 mph. The material, which is traveling within the laminar flow 81, can travel at velocities of about 100 mph. Further, the denser material is traveling in the center of the laminar flow 81 while progressively less dense material travels in the outer portion of the laminar flow 81. As previously mentioned, moisture travels closest to, or in, the boundary layer flow 79.

In addition to the features discussed above, some preferred embodiments of the instant invention further include a controller 116 (see FIG. 1). In some preferred embodiments, the controller 116 is a computer, such as, for example, a personal computer, although any device capable of regulating the amount of air and material input into the system is suitable. To control the amount of air input into the system, some controllers include a variable frequency drive (not shown) which helps to automatically regulate the air flow for a given material. Other controllers allow manual regulation by the user or allow the system parameters to be set to deliver a constant flow.

In addition to regulating the amount of air input, the controller 116 may regulate the speed of the rotor which feeds material into the system. Typically, an optimal ratio exists between the type of material to be input and the amount of air required for a suitable air/material ratio such that a stable flow of material can be created to transport the material. For instance, for coal, the optimal ratio of air to coal is 1.75 to 1.0 volume of air to weight of coal. Conveying of any type of product that flows is also contemplated by this invention. (See FIG. 7)

Other preferred embodiments, also include a moisture collection system 132 and a decelerator 134. With reference to FIG. 7, the moisture collection system 132 is a vacuum system coupled to the outlet conduit 66 at various locations. The moisture collection 132 system pulls moisture off of the boundary layer flow 79 as it travels down the outlet conduit 66. Cyclones can also be used to remove the moisture in other preferred embodiments.

The decelerator 134 slows down the material which is moving through the outlet conduit 66. The decelerator 134 is either a collection bin or a cyclone system. Cyclones are well known in the art and are manufactured by, for example, Fisher-Klosderman, Inc.

In some preferred embodiments, the sizing of the various elements are specifically related to each other. It will be appreciated that this is not intended to restrict-the sizing of any of the elements, but rather to illustrate relationships between elements found in some preferred embodiments.

In one preferred embodiment, many of the elements are sized with respect to the diameter of the outlet conduit. Preferably, the diameter $d_{inlet}$ of the inlet conduit 62 is substantially equivalent to the inner diameter $d_{oc2}$ of the outlet conduit 66. This equivalency in diameters increases the likelihood that materials passing into the system are capable of passing out of the system. The precise diameter of the inlet conduit 68 is, in part, determined based upon the type of material and the rate of material to be input. For instance, materials such as, for example, coal or rubber, less than 1" in size preferably require an inlet diameter of 4" for an input rate of 5 tons/hour.

Regarding the outer barrel 74, the inner diameter of the hollow interior 80 of the outer barrel 74 ranges from about 1.5 to 2.5 times the size of the inner diameter $d_{oc2}$ of the outlet conduit 66. In one preferred embodiment, the inner diameter of the hollow interior 80 is, for example, 8", which is 2.0 times as large as the inner diameter of the outlet conduit 66.

Similar to the outer barrel proportions, the outer diameter $d_{ib}$ of the inner barrel 76 ranges from about 1.0 to 1.5 times the size of the inner diameter of the outlet conduit 66. In one preferred embodiment, the outer diameter of the inner barrel 76 is 5", which is 1.25 times the size of the inner diameter of the outlet conduit 66.

With respect to the accelerating chamber 78, the diameter at the first end $d_1$, (FIG. 6) is equal to the diameter $d_{ob}$ of the outer barrel 74. The diameter of the second end 114 of the conical section 106 is substantially equivalent to the inner diameter of the outlet conduit 66. The length of the conical section $l_a$ is preferably about 1.5 to 2.5 times the inner diameter at the outlet conduit 66. In one preferred embodiment, the length of the conical section 106 is about 8", which is about 2.0 times the size of the inner diameter of the outlet conduit 66.

The diameters of the various elements are not the only proportionally sized aspects of features of preferred embodiments. For instance, the length of the outer barrel 74 preferably ranges from about 2.0 to 4.5 times the size of the outer diameter $d_{oc1}$ of the outlet conduit 66. Further, the opening 82 in the outer barrel 74 which couples to the second end 70 of the inlet conduit 62, is typically 1.5 times the cross-sectional area of the inlet conduit 62 (see FIG. 3b). This allows for faster transport of material into the hollow interior 80 of the outer barrel 74.

Regarding the inner barrel 76, the length $l_{ic}$ of the inner barrel 76 is slightly longer than the length of the outer barrel 74. In preferred embodiments, the inner barrel 76 is longer by about 0.25" to 0.5". In one preferred embodiment, the length of the inner barrel 76 is 0.25" longer than the length of the outer chamber 44, specifically, the length is 12.25".

Figure 10:
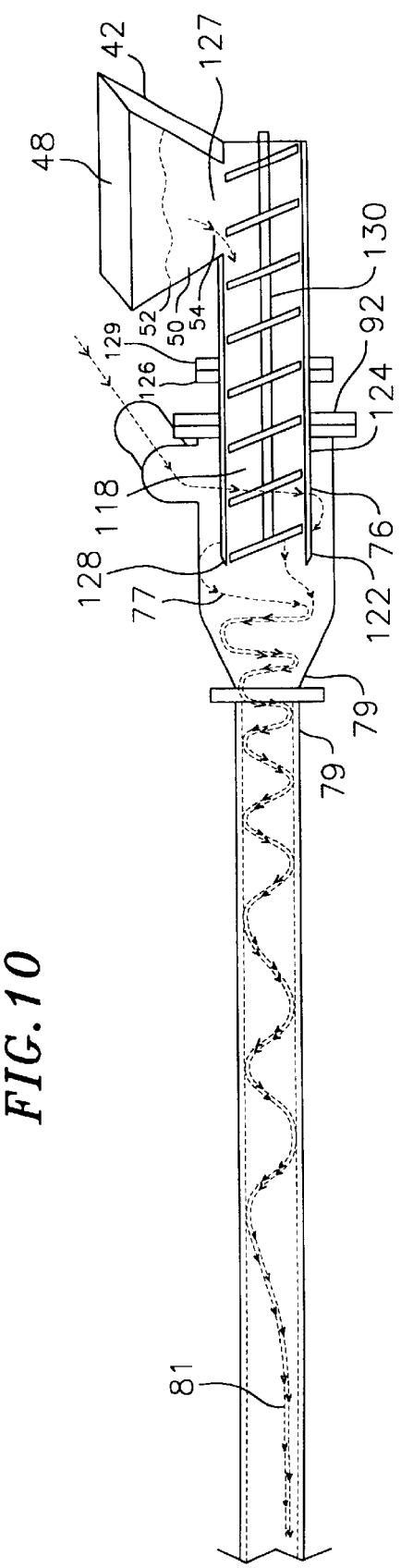
FIG. 10 is a schematic of another preferred embodiment of a material conveying system utilizing an auger within a hollow inner barrel and illustrating the flow paths of the air and material.

With respect to FIG. 10, an alternative embodiment of the instant invention includes an air delivery system 20, a material delivery system 40 and a mixing system 60. Reference is made to the discussions above regarding the air delivery system 20.

In this preferred embodiment, the material delivery system 40 includes a hopper 42, wherein the hopper 42 includes an open end 48 and a chute 50. Reference is made to the discussions above regarding the open end 48 and the chute 50.

The mixing system 60 includes an inlet conduit 62, a mixing chamber 64 and an outlet conduit 66. Reference is made to the discussions above regarding the inlet conduit 62 and the outlet conduit 66.

The mixing chamber 64 further includes an outer barrel 74, an inner barrel 76 and an accelerating chamber 78, wherein the outer barrel 74 and accelerating chamber 78 have been previously discussed.

Figure 9:
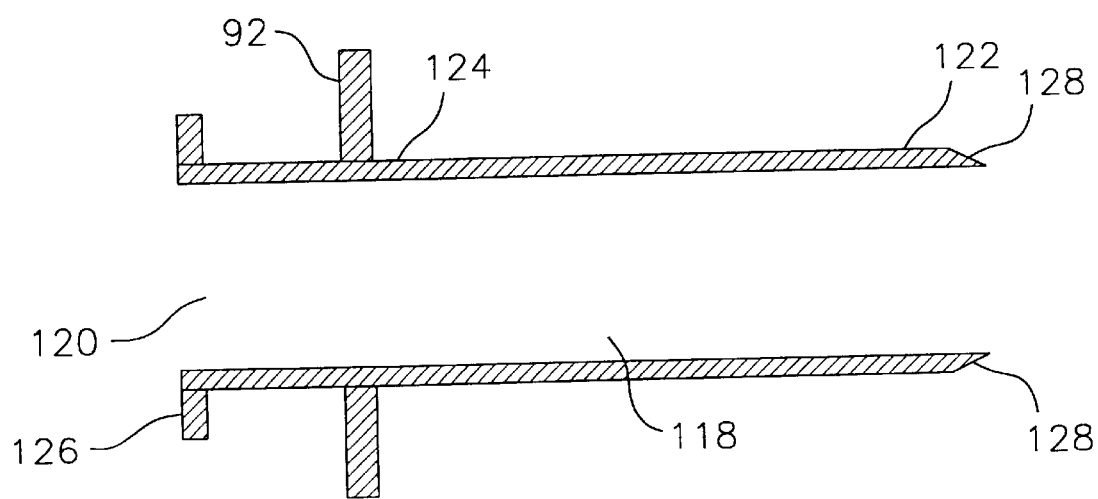
FIG. 9 is a cross section of a preferred embodiment of a hollow inner barrel of the material conveying system.

Also with reference to FIG. 9, the inner barrel 76 includes a hollow interior 118, a first end 120, a second end 122, a coupling position 124, and a mounting flange 92. The first end 120 of the inner barrel 76 is open and includes an annular flange 126 extending radially outward therefrom. The first end 120 must be sized to accept the proper sized auger.

The second end 122 of the inner barrel 76 is also open and further includes beveled ends 128, wherein the ends are beveled inwardly. The diameter of the second end 122 is substantially equivalent to the diameter of the first end 120 such that material input into the inner barrel 76 is capable of exiting the inner barrel 76.

Reference is made to the discussions above regarding the mounting flange 92. However, in this embodiment, the mounting flange 92 is coupled to the inner barrel 76 at the coupling position 124. The coupling position 124 is determined, in part, from the length of the outer barrel 74, wherein the distance between the coupling position 124 and the second end 122 will be about the length of the outer barrel 74 plus an amount in the range of about 0.25"–0.5". In one preferred embodiment, the inner barrel 74 extends 0.25" longer than the outer barrel 76.

With reference to FIG. 10, an auger 130 or screw type conveyor having an opening 127 and an annular flange 129 is disposed within the hollow chamber 118 to move material into the system. Flange 129 of the auger couples to flange 126 of the inner barrel 76. Suitable augers are well known in the art. An auger or screw type material transport is typically used in instances where the material to be conveyed is hot or can damage or destroy the outer surface 98 of the inner chamber 76 as the auger can be treated for specific needs, e.g., chemically treated or heat treated.

In these systems, material falls from the second end 54 of the hopper 42 and is deposited in the auger 130 through the opening 127. The auger 130 moves the material from the point of deposit to the second end 122 of the inner chamber 76. The air, which has entered the system in the same manner as described above, picks up the material at the second end 122 of the inner chamber 76. The remainder of the process, as described above, is the same.

The boundary layer and laminar flows established by preferred embodiments of this invention are capable of maintaining a steady state flow in excess of one mile. Further, these flows can experience elevation changes, such as, for example, 200 foot vertical and directional changes, such as, for example, 90° to 180°, without loss of the steady state flows. Further, due to the relatively low pressure of the input air coupled with the configuration of the mixing chamber 64, this system achieves operating pressures of about 1–4 psi though, the system can operate at pressures up to the maximum obtained by the air system, such as, for example, 12 psi. In addition to reducing blowback problems and increasing distances traveled by the materials, this system has substantially lower operating costs.

In one preferred embodiment, a mile of 2" pipe, coupled together every 20 feet, successfully transported coal through the conduit to the predetermined destination without interruption of the laminar flow, as evidenced by the steady state of the output from the conduit. Further, this piping was laid along an uneven and curved pathway such that the materials traveled through elevational and directional changes. In another instance, 75 tons per hour of coal were moved in a 100' vertical direction and through a 180 degree turn.

Due to the extremely high velocities attained by the material within the flows, laminar and vortex, materials exiting the conduit have been dewatered during transport. Indeed, a product of 3" or less can be dried to within 10% or less of its surface moisture. In some preferred embodiments, a vacuum is coupled to the conduit outlet 66 at various locations and enhances the moisture removal ability of the process. Further, as the materials are all moving at the same velocity, but have different mass, therefore different momentums, the particulate material will naturally separate out according to mass. Thus, one benefit of this system includes the separation of input materials upon discharge. A collection bin for different particulates need only be placed near the outlet 66 to capture the particulate material upon exiting the system.

The measurements given in this disclosure are not intended to limit the invention. Indeed, variations in the size of this system have proven effective and this system is capable of operating as a free standing unit or a cabinet mounted system, e.g., on a trailer which can be transported.

Although the foregoing describes the invention with preferred embodiments, this is not intended to limit the invention. Rather, the foregoing is intended to cover all modifications and alternative constructions falling within the spirit and scope of the invention.

We claim:

1. A flow development chamber comprising:
   an outer barrel having an inlet end, an outlet end and an interior cylindrical surface;
   an accelerating chamber having an inlet end and an outlet end, the inlet end of the accelerating chamber extending concentrically from the outlet end of the outer barrel, the accelerating chamber having a conical interior surface that converges in a direction from the inlet end to the outlet end;
   an inner barrel having an exterior cylindrical surface with a first end and a second end, the inner barrel located concentrically inside the outer barrel, wherein the outer barrel, the inner barrel and the accelerating chamber are arranged to form a substantially unobstructed space between the interior cylindrical surface of the outer barrel and the exterior cylindrical surface of the inner barrel;
   an inlet device mounted to the inlet end of the outer barrel to direct gas through the outer barrel into the unobstructed space and directed tangentially to the interior cylindrical surface of the outer barrel setting up a flow pattern in the unobstructed space such that gas flowing from the inlet conduit into the outer barrel circulates around the inner barrel and traverses the unobstructed space from the inlet end of the outer barrel toward the outlet end of the outer barrel;
   a pipe extending from the outlet end of the accelerating chamber;
   wherein the first end of the exterior cylindrical surface of the inner barrel is adjacent the inlet device and the second end of the exterior cylindrical surface of the inner barrel is adjacent the accelerating chamber;
   wherein the substantially unobstructed space extends from the inlet device to the conical interior surface of the accelerating chamber;

2. The flow development chamber of claim 1, wherein the inner barrel is closed by being solid.

3. The flow development chamber of claim 1, wherein the inner barrel is closed at the downstream end.

4. The flow development chamber of claim 1, wherein the inner barrel is closed preventing flow therethrough.

5. The flow development chamber of claim 1, wherein the conical interior surface of the accelerating chamber is without flow obstructions.

6. The flow development chamber of claim 1, wherein the second end of the exterior cylindrical surface of the inner barrel is adjacent a substantially unobstructed downstream area located within the conical interior surface of the accelerating chamber.

7. The flow development chamber of claim 1, wherein the second end of the exterior cylindrical surface of the inner barrel is closer to the inlet end of the accelerating chamber than to the outlet end of the accelerating chamber.

8. The flow development chamber of claim 1, wherein the first end of the exterior cylindrical surface of the inner barrel is located radially inward of the inlet device.

9. The flow development chamber of claim 1, wherein the inner diameters of the pipe and the outlet end of the accelerating chamber are substantially the same.

10. A flow development chamber comprising:
    an outer barrel having an inlet end, an outlet end and an interior cylindrical surface;
    an accelerating chamber having an inlet end and an outlet end, the inlet end of the accelerating chamber extending concentrically from the outlet end of the outer barrel, the accelerating chamber having a conical interior surface that converges in a direction from the inlet end to the outlet end;
    an inner barrel having an exterior cylindrical surface with a first end and a second end, the inner barrel located concentrically inside the outer barrel, wherein the outer barrel, the inner barrel and the accelerating chamber are arranged to form a substantially unobstructed space between the interior cylindrical surface of the outer barrel and the exterior cylindrical surface of the inner barrel, the unobstructed space extending from the first end of the exterior cylindrical surface of the inner barrel to the conical interior surface of the accelerating chamber;

an inlet conduit mounted to the inlet end of the outer barrel to direct gas through the outer barrel into the unobstructed space;

a pipe extending from the outlet end of the accelerating chamber;

wherein the first end of the exterior cylindrical surface of the inner barrel is adjacent the inlet conduit and the second end of the exterior cylindrical surface of the inner barrel is adjacent the accelerating chamber;

wherein the inlet conduit is directed tangentially to the interior cylindrical surface of the outer barrel setting up a flow pattern in the unobstructed space such that gas flowing from the inlet conduit into the outer barrel circulates around the inner barrel and traverses the unobstructed space from the inlet end of the outer barrel toward the outlet end of the outer barrel;

11. The flow development chamber of claim 10, wherein the second end of the exterior cylindrical surface of the inner barrel is adjacent a substantially unobstructed downstream area located within the conical interior surface of the accelerating chamber.

12. A pneumatic conveying system comprising:

a flow development chamber;

a gas delivery system including a gas delivery conduit to deliver gas to the flow development chamber;

a product delivery system including a housing to hold product to be conveyed and a product delivery conduit connected to the gas delivery conduit at a location upstream of the flow development chamber to deliver the product to the gas delivery conduit such that gas and product are combined prior to entering the flow development chamber;

wherein the flow development chamber includes:
an outer barrel having an inlet end, an outlet end and an interior cylindrical surface;
an accelerating chamber having an inlet end and an outlet end, the inlet end of the accelerating chamber extending concentrically from the outlet end of the outer barrel, the accelerating chamber having a conical interior surface that converges in a direction from the inlet end to the outlet end;
an inner barrel having an exterior cylindrical surface with a first end and a second end, the inner barrel located concentrically inside the outer barrel, wherein the outer barrel, the inner barrel and the accelerating chamber are arranged to form a substantially unobstructed space between the interior cylindrical surface of the outer barrel and the exterior cylindrical surface of the inner barrel;
an inlet device mounted at one end to the gas delivery conduit and at the other end to the inlet end of the outer barrel and directed tangentially to the interior cylindrical surface of the outer barrel;
a cylindrical outlet conduit coupled to the outlet end of the accelerating chamber, the inner diameters of the outlet conduit and the outlet end of the accelerating chamber being substantially the same;
wherein the first end of the exterior cylindrical surface of the inner barrel is adjacent the inlet device and the second end of the exterior cylindrical surface of the inner barrel is adjacent the accelerating chamber;
wherein the substantially unobstructed space extends from the inlet device to the conical interior surface of the accelerating chamber.

13. The flow development chamber of claim 12, wherein the conical interior surface of the accelerating chamber is without flow obstructions.

14. The flow development chamber of claim 12, wherein the second end of the exterior cylindrical surface of the inner barrel is closer to the inlet end of the accelerating chamber than to the outlet end of the accelerating chamber.

15. The flow development chamber of claim 12, wherein the first end of the exterior cylindrical surface of the inner barrel is located radially inward of the inlet device.

16. The flow development chamber of claim 12, wherein the inner barrel is closed preventing flow therethrough.

17. The flow development chamber of claim 10, wherein the inner barrel is closed preventing flow therethrough.

18. The flow development chamber of claim 10, wherein the conical interior surface of the accelerating chamber is without flow obstructions.

19. The flow development chamber of claim 10, wherein the first end of the exterior cylindrical surface of the inner barrel is located radially inward of the inlet conduit.

20. The flow development chamber of claim 10, wherein the inner diameters of the pipe and the outlet end of the accelerating chamber are substantially the same.

21. A flow development chamber comprising:

an outer barrel having an inlet end, and outlet end and an interior cylindrical surface;

an accelerating chamber having an inlet end and an outlet end, the inlet end of the accelerating chamber extending concentrically from the outlet end of the outer barrel, the accelerating chamber having a conical interior surface that converges in a direction from the inlet end to the outlet end;

an inner barrel having an exterior cylindrical surface with a first end and a second end, the inner barrel located concentrically inside the outer barrel, wherein the outer barrel, the inner barrel and the accelerating chamber are arranged to form a substantially unobstructed space between the interior cylindrical surface of the outer barrel and the exterior cylindrical surface of the inner barrel;

an inlet device mounted to the inlet end of the outer barrel to direct gas through the outer barrel into the unobstructed space and directed tangentially to the interior cylindrical surface of the outer barrel setting up a flow pattern in the unobstructed space such that gas flowing from the inlet conduit into the outer barrel circulates around the inner barrel and traverses the unobstructed space from the inlet end of the outer barrel toward the outlet end of the outer barrel;

wherein the first end of the exterior cylindrical surface of the inner barrel is adjacent the inlet device and the second end of the exterior cylindrical surface of the inner barrel is adjacent the accelerating chamber;

wherein the substantially unobstructed space extends from the inlet device to the conical interior surface of the accelerating chamber;

wherein the conical interior surface of the accelerating chamber is without flow obstructions.

22. The flow development chamber of claim 21, wherein the inner barrel is closed preventing flow therethrough.

23. The flow development chamber of claim 21, wherein the second end of the exterior cylindrical surface of the inner barrel is adjacent a substantially unobstructed downstream area located within the conical interior surface of the accelerating chamber.

24. The flow development chamber of claim 21, wherein the second end of the exterior cylindrical surface of the inner barrel is closer to the inlet end of the accelerating chamber than to the outlet end of the accelerating chamber.

25. The flow development chamber of claim 21, wherein the first end of the exterior cylindrical surface of the inner barrel is located radially inward of the inlet device.

26. The flow development chamber of claim 21, wherein the inner diameters of the pipe and the outlet end of the accelerating chamber are substantially the same.

27. The flow development chamber of claim 10 wherein the second end of the exterior cylindrical surface of the inner barrel is closer to the inlet end of the accelerating chamber than to the outlet end of the accelerating chamber.

28. A pneumatic conveying system comprising:
   a flow development chamber;
   a gas delivery system including a gas delivery conduit to deliver gas to the flow development chamber;
   a product delivery system including a housing to hold product to be conveyed and a product delivery conduit connected to the gas delivery conduit at a location upstream of the flow development chamber to deliver the product to the gas delivery conduit such that gas and product are combined prior to entering the flow development chamber;
   wherein the flow development chamber includes:
   an outer barrel having an inlet end, and outlet end and an interior cylindrical surface;
   an accelerating chamber having an inlet end and an outlet end, the inlet end of the accelerating chamber extending concentrically from the outlet end of the outer barrel, the accelerating chamber having a conical interior surface that converges in a direction from the inlet end to the outlet end;
   an inner barrel having an exterior cylindrical surface with a first end and a second end, the inner barrel located concentrically inside the outer barrel, wherein the outer barrel, the inner barrel and the accelerating chamber are arranged to form a substantially unobstructed space between the interior cylindrical surface of the outer barrel and the exterior cylindrical surface of the inner barrel, the unobstructed space extending from the first end of the exterior cylindrical surface of the inner barrel to the conical interior surface of the accelerating chamber;
   an inlet conduit mounted at one end to the gas delivery conduit and at the other end to the inlet end of the outer barrel to direct gas from the gas delivery system and product from the product delivery system through the outer barrel into the unobstructed space;
   a cylindrical outlet conduit coupled to the outlet end of the accelerating chamber, the inner diameters of the outlet conduit and the outlet end of the accelerating chamber being substantially the same;
   wherein the first end of the exterior cylindrical surface of the inner barrel is adjacent to the inlet conduit, and the second end of the exterior cylindrical surface of the inner barrel is adjacent the accelerating chamber;
   wherein the inlet conduit is directed tangentially to the interior cylindrical surface of the outer barrel to set up a flow pattern in the unobstructed space such that gas flowing from the inlet conduit into the outer barrel will circulate around the inner barrel and traverse the unobstructed space from the inlet end of the outer barrel toward the outlet end of the outer barrel.

29. The pneumatic conveying system of claim 28, wherein the second end of the exterior cylindrical surface of the inner barrel is adjacent a substantially unobstructed downstream area such that the circulating flow of the gas in the unobstructed space is converted to a vortex flow in the accelerating chamber when gas is supplied to the system.

30. The pneumatic conveying system of claim 28 wherein the gas delivery system includes a blower assembly, wherein the blower assembly supplies gas to the chamber.

* * * * *